United States Patent
Jiang et al.

(10) Patent No.: US 6,687,111 B2
(45) Date of Patent: Feb. 3, 2004

(54) ELECTROMAGNETIC MARK DEVICE FOR A MAGNETISM ENCODER

(75) Inventors: Shyh Biau Jiang, Taipei (TW); Dong Liang Lee, Keelung (TW); Chi Ming Yang, Ilan (TW); Hsin Ming Chang, Hsinchu (TW); Chuan Fu Huang, Taipei (TW)

(73) Assignee: View Move Technologies, Inc. (TW)

( * ) Notice: Subject to any disclaimer, the term of this patent is extended or adjusted under 35 U.S.C. 154(b) by 55 days.

(21) Appl. No.: 10/163,193

(22) Filed: Jun. 5, 2002

(65) Prior Publication Data

US 2003/0076091 A1 Apr. 24, 2003

(30) Foreign Application Priority Data

Oct. 19, 2001 (TW) .......................... 90125862 A

(51) Int. Cl.⁷ .............................................. H01H 47/00
(52) U.S. Cl. .................. 361/143; 361/139; 361/146
(58) Field of Search .................. 361/143, 51, 146, 361/139

(56) References Cited

U.S. PATENT DOCUMENTS

| | | | |
|---|---|---|---|
| 3,978,588 A | * 9/1976 | Richardson et al. | .......... 33/701 |
| 4,274,053 A | 6/1981 | Ito et al. | ...................... 324/174 |
| 4,319,188 A | 3/1982 | Ito et al. | ...................... 324/173 |
| 4,440,019 A | * 4/1984 | Marshall | .................. 73/152.56 |
| 4,774,464 A | 9/1988 | Kubota et al. | ............... 324/208 |
| 4,851,711 A | 7/1989 | Chan et al. | ................. 307/288 |
| 4,988,945 A | 1/1991 | Nagase | ........................ 324/175 |
| 5,036,276 A | 7/1991 | Aizawa | .................. 324/207.21 |
| 5,036,319 A | 7/1991 | Shiraki et al. | ............... 341/115 |
| 5,159,499 A | * 10/1992 | Goodman et al. | ............. 360/1 |
| 5,172,057 A | 12/1992 | Yoshimura et al. | ..... 324/207.21 |
| 5,258,735 A | 11/1993 | Allwine, Jr. | ................. 335/306 |
| 5,302,893 A | 4/1994 | Yoshimura | ................... 324/174 |
| 5,325,056 A | 6/1994 | Shonowaki et al. | ... 324/207.21 |
| 5,489,845 A | 2/1996 | Weber et al. | ........... 324/207.25 |
| 5,757,180 A | 5/1998 | Chou et al. | ............... 324/207.2 |
| 5,783,940 A | 7/1998 | Kolomeitsev | .......... 324/207.25 |
| 5,939,879 A | 8/1999 | Wingate et al. | ........ 324/207.17 |
| 5,949,051 A | 9/1999 | Kiriyama | ..................... 235/449 |

* cited by examiner

Primary Examiner—Stephen W Jackson
(74) Attorney, Agent, or Firm—Connolly, Bove Lodge & Hutz

(57) ABSTRACT

An electromagnetic mark device for any type of magnetism encoder applies the electric current magnetic field as the electromagnetic mark thereof. The electromagnetic mark device comprises an insulated base plate and a thin lead wire. The thin lead wire is fixed to the insulated base plate. It is characterized in that the thin lead wire is laid out on the base plate as a circuit in a way of providing a continuously twisted and turned shape with a constant pitch. Hence, alternate magnetic marks are formed with continuous magnetic poles N·S·N·S once the current passes the lead wire. The electromagnetic mark device can be adapted to a linear ruler or a rotary dial in the magnetism encoder to detect a relative displacement, velocity and angular velocity of a moving object so that the present invention can offer more stable signals and more accurate detection of location with being fabricated more easily.

8 Claims, 6 Drawing Sheets

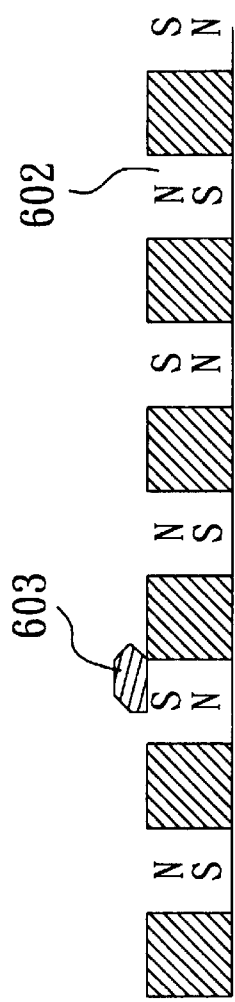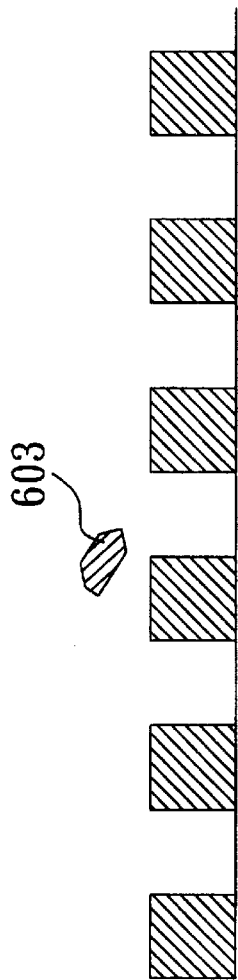

US 6,687,111 B2

ELECTROMAGNETIC MARK DEVICE FOR A MAGNETISM ENCODER

BACKGROUND OF THE INVENTION

1. Field of the Invention

The present invention relates to an electromagnetic mark device for a magnetic encoder, and, particularly, to a device, which can generate a magnetic field by way of the current to make magnetic marks much easily, such that it is possible to reduce the pitch between any two neighboring magnetic marks greatly so as to enhance the accuracy of the magnetic encoder in addition to the magnetic field being set up reliably with stable magnetic flux.

2. Description of Related Art

Generally, a technical application of an encoder is to measure the relative position, the velocity and the angular velocity of an object such that the object can be located more accurately. The principle thereof is to fix a series of magnetic marks equidistantly on a base, and a magnetic resistance element is utilized to pass through the magnetic lines of force on each magnetic mark so as to sense a change of signal for determining a relative position of a moving object. A measure apparatus thereof is usually called an encoder, wherein, the apparatus used for measuring a linear position of the object is called a linear encoder and for measuring a rotational angle of the object is called an angular encoder.

A conventional encoder as shown in FIG. 1 comprises a stationary ruler body 101, two opposite guard layers 102, 103 disposed at the upper and the lower ends of the ruler body 101, and a sensor 104. A plurality of magnetic marks N, S, N, S, ... with a constant pitch arranged on the ruler body 101 in a way of adjacent magnetic poles of the magnetic marks being disposed alternately. The sensor 104 is fixedly attached to a moving mechanism and provided with two magnetic resistance sensing elements 104A, 104B. When the moving mechanism carries the sensor 104 to move along the ruler body with a relative constant velocity, the sensing elements 104A, 104B have different resistances during passing through different magnetic fields on the ruler body 101. Signals on the sensing elements 104A, 104B as shown in FIG. 2 includes a signal approximate sine wave and a signal approximate cosine wave respectively. The signals can be treated and figured out the number of pulse waves such that it is possible to find out the displacement of the moving mechanism relative to the stationary mechanism. Wherein, in case of the moving mechanism displacing in a direction designated as 105A, the sensing element 104A phase-leads the sensing element 104B, and, in case of the moving mechanism displacing in a direction designated as the sensing element 104A phase-lags the sensing element 104B. Hence, it is possible to determine if the moving mechanism is turning forward or turning inversely based on the state of phase thereof.

It can be learned from the preceding analysis that the encoder has the resolution thereof to be determined by way of the capability of picking up the signal from the sensor and the accuracy of the magnetic marks on the ruler body. But, problems caused by both of the magnetization technique and the magnetic material result in that it is hard to shorten the pitch between magnetic poles. The prior art mostly emphasizes on the improvement of the capability of picking up the signal of sensor such as the selection of magnetic resistance material and the arrangement of signals in the sensor, or on the improvement of the manufacturing process to the sensibility of flux, the anti-noise of flux and the characteristics of temperature change. However, the prior art provides less improvement on the ruler body making and the mode for producing the magnetic marks.

For producing the magnetic marks on the ruler body, the magnetic material in the prior art is mostly utilized to coat the ruler body and then the magnetic marks are produced by way of magnetization. Theoretically, the smaller the graduations of the magnetic marks are, the higher the resolution will be, but, smaller graduations of magnetic marks may confront many problems. Firstly, the magnetization work is required to up-grade for meeting the needed accuracy such that it becomes more difficult to produce the magnetic marks and the production cost for the magnetic marks increases considerably. Next, a smaller pitch may increase the error percentage of the magnetic marks under the condition of same error such that it requires a higher working accuracy for maintaining the same error percent. Hence, the density of coating on the magnetic material has to be increased relatively. Further, it is hypothesized that the ruler body is made of homogeneous material at the time of being designed and the hypothesis is proper in case of the pitch being much greater than the grain size of the magnetic material. While the pitch is shortened to be close to the grain size of the magnetic material, it may affect the intensity of magnetic field to generate noise if the magnetic material is not so homogeneous as the original hypothesis. In order to avoid the noise generated from the material, a smaller grain size and a more strict homogeneity have to be reached synchronously with the reduced pitch such that the material is required to provide a better homogeneity as soon as the graduations of the magnetic marks become smaller. In practice, the magnetic marks of the ruler body usually are magnetized on a magnetic rubber and the pitch is restricted in a range of 5 mm to 10 mm due to being affected by the grain size and the homogeneity of the material. If the pitch is required to reduce further, a special magnetic material has to be plated on a hard base plate as a medium for magnetic marks. However, the special magnetic material mostly is made of alloy so that, on the one hand, it is not easy to be coated on the magnetic material and, on the other hand, it is easy to be scratched. Moreover, the surface of the special material may crack because of the factor of temperature. Unfortunately, the signal of the encoder may arise noise regardless the crack or the scratch. Secondly, in addition to the limitation concerning the characteristics of the material, the smaller the magnetic graduation is, the stricter the control with regard to the density and the accuracy of the magnetization is required. Hence, the accuracy of the magnetic marks on the ruler body is hard to be enhanced due to the restricted technique of magnetization.

Besides, the permanent magnetic material is normally utilized to produce the magnetic marks on the ruler body but in case of being adsorbed with magnetic dust, being not uniform at the interior thereof, being scratched at the outer surface thereof, or being interfered by the foreign magnetic field, the permanent magnetic material may generate the noise. Further, the smaller magnetic graduation needs a small corresponding signal but the noise still remains unchanged. Moreover, the smaller magnetic graduation may results in a smaller signal/noise ratio and the incorrect signal will be generated undesirably. Further, the permanent magnetic material can be demagnetized by the interference of a more powerful external magnetic field but the smaller magnetic graduation may result in a smaller magnetic flux and a smaller magnetic force needed for the demagnetization. Hence, Once strong lines of magnetic force exist in the work environment, the magnetic marks has an increased possibility of being demagnetized relatively so that it has a certain limit to reduce the graduation. In practice, a lot of uncertain lines of magnetic force may distribute over around an environment in which motors are in use in addition to many magnetic material being able to generate dust such that extraordinary magnetic marks may be influenced by the apertures in the magnetic material, scratches on the ruler body, the adsorption of the magnetic dust and the interference of the magnetic field to produce incorrect signal. Furthermore, the reduced magnetic graduation may result in the permanent magnetic material being demagnetized or magnetized improperly and it may cause the permanent damage if the ruler body is carelessly exposed to the strong magnetic field during setting up the encoder. Therefore, the preceding internal and external problems are always there if the permanent magnetic field is utilized as marks and the manufacturers are incapable of solving the problems effectively.

SUMMARY OF THE INVENTION

Accordingly, an object of the present invention is to provide an electromagnetic mark device for a magnetism type linear and curvilinear encoders, which can generate a magnetic field by way of electric current, so as to shorten the magnetic gap between the magnetic marks greatly so that the resolution thereof can be enhanced to promote accuracy thereof during performing a detection job for the position of an object.

Another object of the present invention is to provide an electromagnetic mark device for a magnetism type linear and curvilinear encoder, in which the magnetic field intensity is independent of the homogeneity of material thereof and not demagnetized by the external magnetic field, so as to assure the position of an object being detected stably.

A further object of the present invention is to provide an electromagnetic mark device for a magnetism type linear and curvilinear encoder, which can be fabricated by way of photo etching, so as to lower down the production cost of the precision magnetic ruler with high resolution.

According to the present invention, the concept of electromagnetism with regard to the characteristics of a plane perpendicular to the electric current being capable of forming an annular magnetic field is applied so that a base plate of a ruler body for a framework of magnetic marks is arranged with a lead wire to divide the ruler body with a fixed pitch. As soon as the current passes through the lead wire, adjacent lead wire sections thereof can produce a magnetic field with continuous north poles (N) and south poles (S) being distributed alternately such that alternate magnetic marks N·S·N·S . . . are formed on a flat surface of the ruler body instead of the magnetic ruler made of permanent magnetic material to offer the same effect as the permanent ruler body does. For instance, the lead wires can be formed as a continuous S-shaped wave to divide the ruler body with a fixed pitch and the manufacturing process in practice is to etch the base plate with the technique of photo etching such that 0.004" width lead wire and 0.006" (0.15 mm) pitch of S-shaped wave can be formed. Hence, the present invention can provide magnetic marks on the ruler base plate with a pitch being reduced to 0.15 mm and it is not possible for the prior art to reach so that the resolution thereof can be enhanced greatly and the detection for the position of an object can be performed more accurately. In addition, the magnitude of the magnetic force varies in accordance with the current so that it secure the magnetic field remaining unchanged as long as the current is kept to pass through the lead wires.

BRIEF DESCRIPTION OF THE DRAWINGS

The present invention can be more fully understood by reference to the following detailed description and accompanying drawings, in which:

FIG. 7 is a sectional view of the electromagnetic mark device of the present invention illustrating the magnetic marks adsorbing the magnetic dust FIG. 8 is a sectional view of the electromagnetic mark device of the present invention similar to FIG. 7 illustrating the magnetic dust not accumulating on the electromagnetic mark device while not in use;

DETAILED DESCRIPTION OF THE PREFERRED EMBODIMENT

An electromagnetic mark device disclosed in the present invention applies a magnetic field induced by the current to serve as magnetic marks of an encoder so as to constitute a layout of magnetic zone with alternately disposed N·S·N·S . . .

Figure 1:
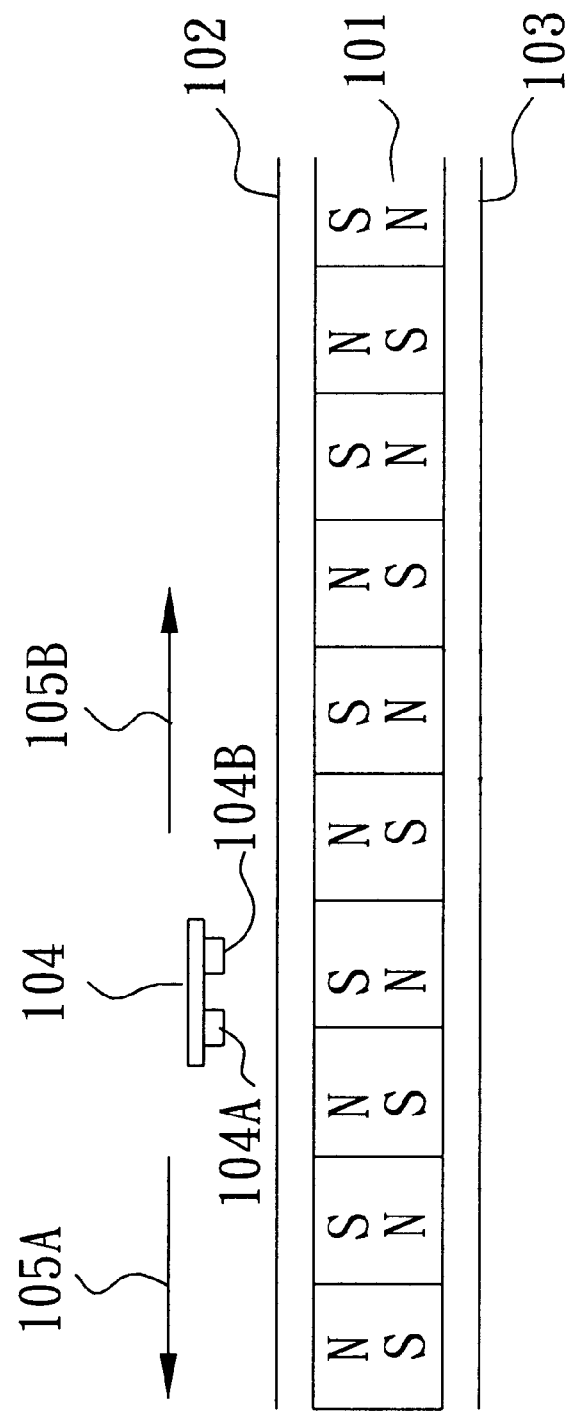
FIG. 1 is a schematic diagram of a basic structure of a conventional linear encoder illustrating the principle of detecting the position of an object by way of a mark ruler of magnetic field.
Figure 2:
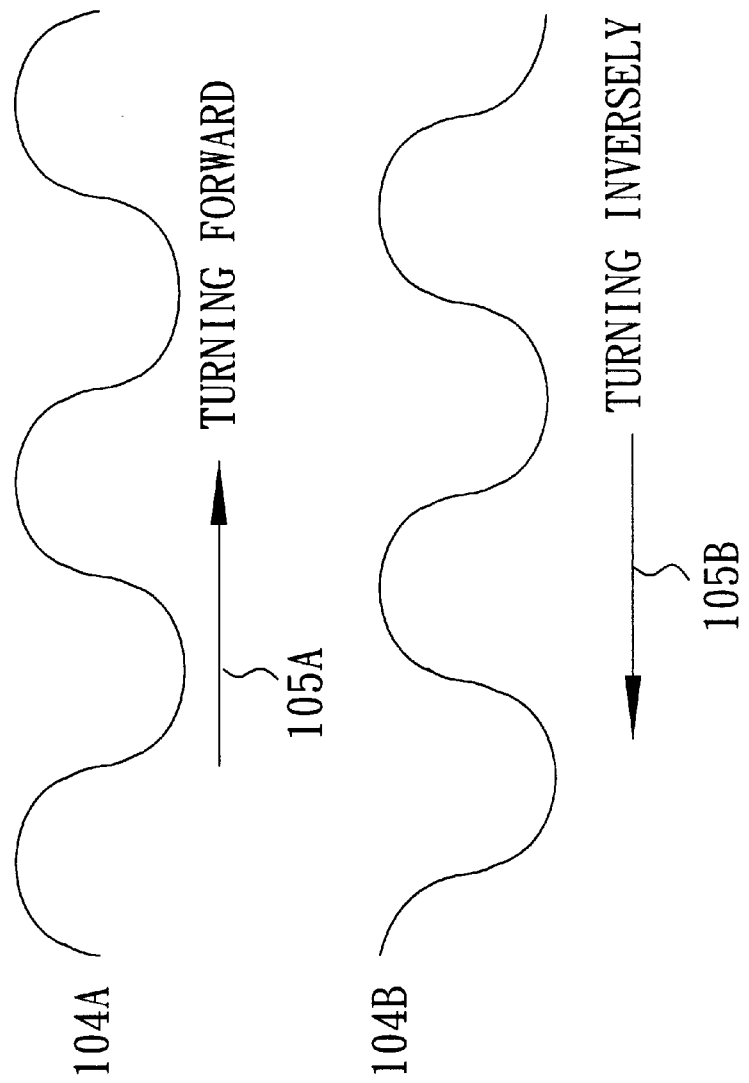
FIG. 2 is a schematic diagram of signals picked by the linear encoder shown in FIG. 1 via the magnetic field ruler and arrows therein indicating moving directions.
Figure 3:
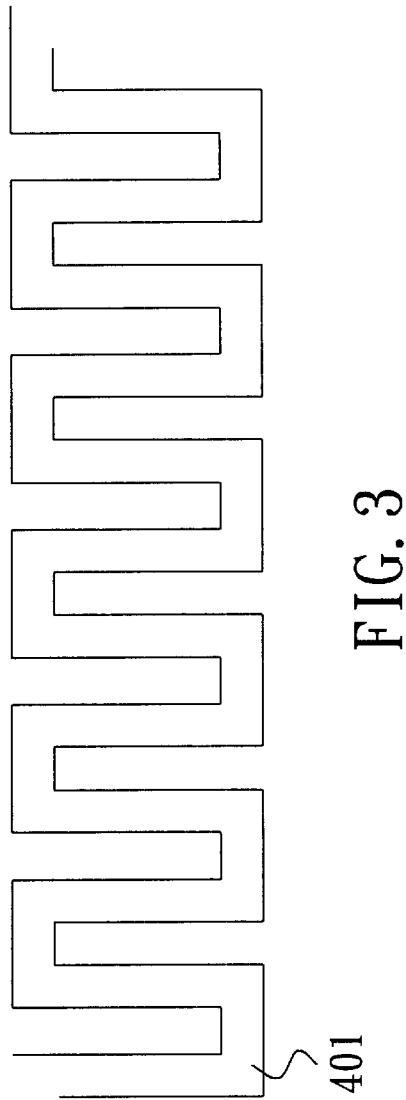
FIG. 3 is a top view of an electromagnetic mark device according to the present invention illustrating a lead wire thereof having been layout as a shape of fluctuations with an identical pitch.
Figure 4:
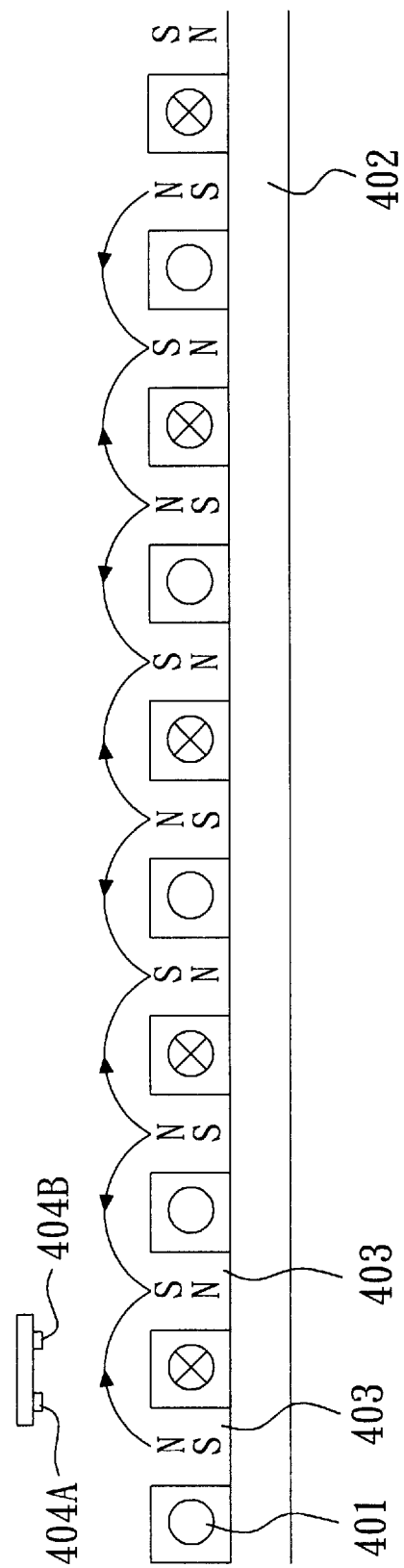
FIG. 4 is a front view of FIG. 3.

First of all, referring to FIGS. 3 and 4, a typical example of lead wire circuit layout according to the present invention basically has a lead wire 401 being twisted and turned as a shape of square waves and being arranged on an insulation circuit base plate 402 to form a ruler body. In practice, the square wave shaped lead wire can be made by way of existing technique of printed circuit board or photo-etching to provide a width of 0.04" (0.15 mm) or can be fabricated by way of well known numerical controlled machine.

When the current passes through the twisted and turned lead wire 401 as shown in FIG. 4, it can be seen that the current moving in the lead wire has a changed direction alternately along the lead wire 401. That is, the direction of moving current at any longitudinal section of the lead wire 401 is different from that in any other longitudinal section next to it such that different magnetic zones 403 may be obtained between any two longitudinal sections of the lead wire 401. Hence, alternate magnetic zones N·S·N·S . . . are produced along the entire lead wire 401 to serve as magnetic marks for offering information of detecting the location of an object as the conventional way does.

As the foregoing, the present invention has applied the magnetic field induced by the current to serve as the magnetic marks and can reach the following effects:

1. The magnetic mark device of the present invention can be made by way of the technique for making the conventional printed circuit board, the photo-etching technique or the numerical controlled machine so that the fabrication cost thereof is lower.

2. In case of being worked by way of the photo-etching technique, it is possible for the present invention to produce more accurate magnetic marks with a reduced pitch.

3. The magnetic marks of the present invention are formed by the magnetic field due to the current passing through the lead wire so that the magnetic field intensity can be well controlled and it is a great possibility for the magnetic field intensity to be reinforced. Thus, it is much more easier for magnetic resistance elements 404A, 404B to magnify induction signals thereof. Further, a magnetic field can be generated with the same current even different polar pairs are used and the identical magnetic field can reoccur with different polar pairs. In the meantime, the magnetic resistance elements can provide a good reoccurrence of output signals.

4. The electromagnetic marks of the present invention are belonged to a kind of magnetic mark so that the structure thereof and the arrangement of magnetic resistance elements can be designed as the structure of the permanent magnet type ruler and encoder. Hence, the present invention can be set up and assembled as the permanent magnet type ruler and encoder has been done such that the training cost of the assembling personnel and the expense for purchasing the assembling tool can be lower down to promote the acceptance of the product in the market.

Figure 5:
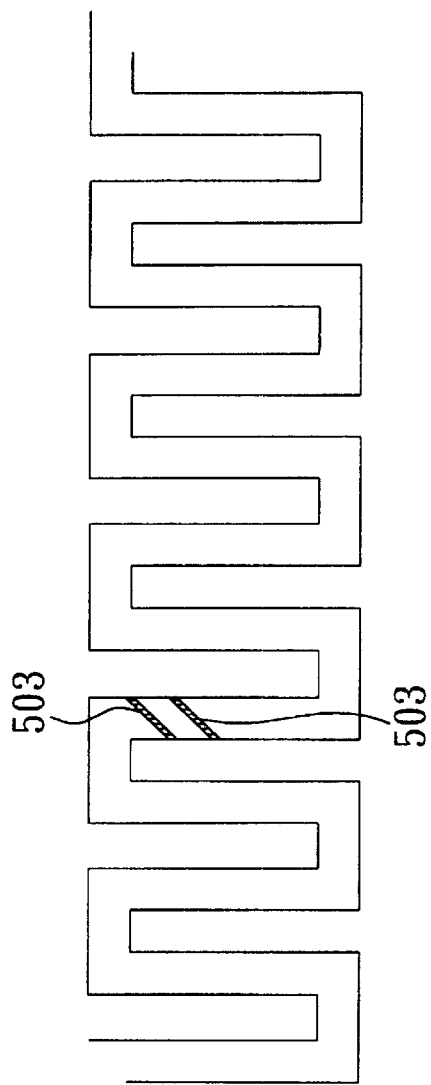
FIG. 5 is a top view of an electromagnetic mark device similar to FIG. 3 illustrating the lead wire being uneven with scratches thereon and not influencing the magnitude of the generated magnetic fields.
Figure 6:
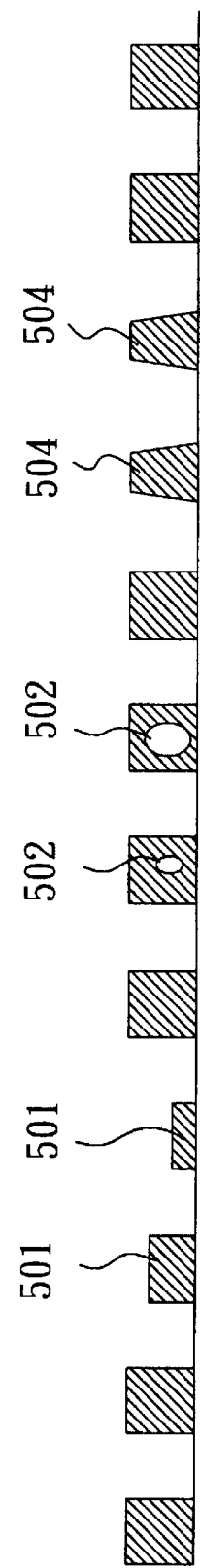
FIG. 6 is a front view of FIG. 5.

Referring to FIGS. 5 and 6, although the resistance of the circuit surrounding the respective magnetic mark may be affected by the defects of the conductive wire 401 such as unequal thickness of copper foils 501, unequal size of wire holes 502, scratches 503 hurting the surface of the wire during operation or width varieties 504 caused by a change of etching conditions, each magnetic mark still can have the same magnitude of current due to the twist and turn line of each magnetic mark being connected in series so that the magnetic intensity at each magnetic mark provides the same magnitude also. If the current for producing the magnetic marks is supplied by a constant current source, the magnitude of current in the lead wire can remain unchanged in spite of the overall resistance of the linear ruler or the encoder being varied because of scratches on the wire, uneven material, a change of plating thickness or a change of etching condition. Comparing to the permanent type device, the magnetic marks offered by the present invention are much more accurate and stable than the permanent type device and provided with high reproduction easily. However, the magnetic field and the intensity of the eddy current generated by the permanent type device varies in accordance with the homogeneity of material, the thickness and the intensity of magnetization respectively. Hence, the present invention can offer the following two more effects:

5. The intensity of magnetic marks produced by the present invention is not affected by the changes of the homogeneity of material, the thickness and the width of the wire respectively during working. However, the preceding changes may cause a changeable output signal in the prior art. Hence, the magnetic marks made with the present invention provide a more stable intensity than the prior art so that a high perfection rate of the finished product and a lower cost for the quality control can be obtained effectively.

6. The intensity of the magnetic marks made with the device of the present invention is not influenced by the scratched surface of the ruler body so that it is endurable for the magnetic mark device of the present invention to be operated in a worse working environment. Accordingly, the life span of the product with an increased reliability can prolong effectively.

Referring to FIGS. 7 and 8, it will be illustrated that it is not possible for the electro-magnetic mark device of the present invention to accumulate the magnetic dust. When the lead wire 401 is in a state of being electrified, the magnetic dust 603 will be adsorbed on the electromagnetic device. Once the electromagnetic encoder does not read the signal on the magnetic resistance element of the magnetic sensor, the constant current source can be turned off to cancel the magnetism of the electromagnetic marks so as to release the magnetic dust. Thus, on the one hand, once the magnetic dust is not adsorbed on the magnetic ruler, the interference originated from the magnetic dust can be reduced greatly. On the other hand, it is easy to clean up the dust on the magnetic mark device as soon as the maintenance is engaged. Because the linear ruler and the encoder are often adapted to a linear motor and a motor respectively, many parts in the motor are made of magnetic material and the rotor rotates around the stator in the motor over a long period of time so that it is natural to cause the magnetic dust. Therefore, it is superior to the magnetic marks of the permanent magnet that the present invention is capable of being free from the magnetic dust. Hence, the present invention can offer following one more effect:

7. The respective magnetic mark of the present invention is an electromagnetic field and the electro-magnetic field can only be produced during the respective magnetic mark is in use so that the magnetic dust cannot be adsorbed permanently and the interfering noise resulting from the magnetic dust becomes much less. Hence, it is very easy to clean up the magnetic dust.

Figure 9:
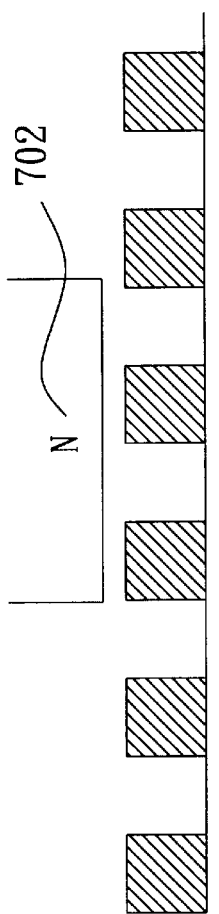
FIG. 9 is a sectional view of the electromagnetic mark device of the present invention similar to FIG. 7 illustrating magnet residue resulting from a strong magnetic field marks induced by the current.
Figure 10:
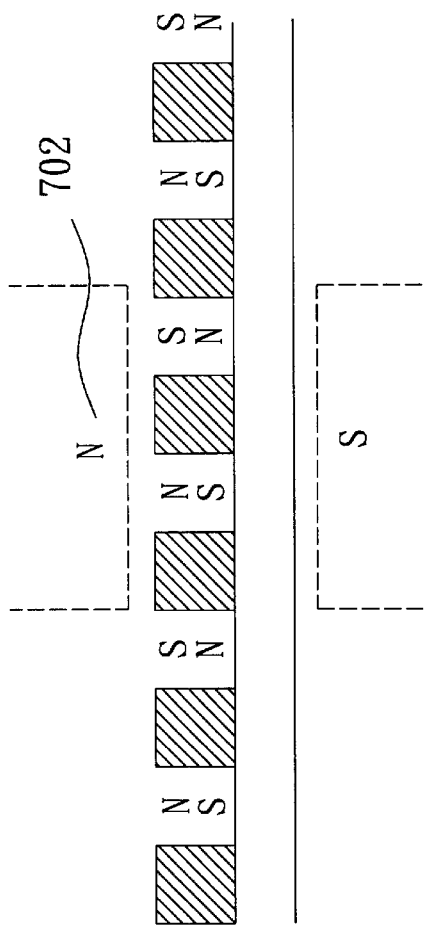
FIG. 10 is a sectional view of the electromagnetic mark device of the present invention similar to FIG. 9 illustrating magnet residue resulting from a strong magnetic field marks induced by the current will not influence subsequent magnetic marks.

Referring to FIGS. 9 and 10, due to the magnetic ruler body being made of non-magnetic material, no any magnetism may reside on the magnetic ruler while the magnetic ruler body is placed in and then taken out from the strong magnetic field 702. Because the ruler body provides no residual magnetism, next magnetic field intensity can be formed independent of the preceding magnetic field intensity as soon as the ruler is electrified. The magnetic marks of the present invention is an electromagnetic field, which is formed only at the time of operation, so that the problem of demagnetization resulting from the magnetic marks accidentally passing through the strong magnetic field will not happen. The permanent magnetic material does happen the preceding problem. Due to being not easy to seal the stator and the rotor in the linear motor for keeping off the dust, it would be better that the linear ruler adapted to the linear motor can provide a better dust protection. However, the stator of the linear motor is made of strong magnet and it is easy to demagnetize the permanent magnetic marks. Hence, the magnetic mark device of the present invention can solve the problem and offers one more following effect:

8. The present invention does not provide any magnetic material so that the magnetic marks on the ruler body are not subjected to the action of the foreign magnetic field so as not to become demagnetized. Accordingly, the cost arose from the assembling and delivering the encoder with the magnetic mark device of the present invention can be lower down greatly.

It is appreciated from the preceding embodiment description of the present invention that the technique of electric current type magnetic marks can reduce the pitch arranged between two neighboring alternate magnetic zones largely to enhance the measure accuracy during the position of an object being detected and to promote the stability significantly during the detection being performed.

While the invention has been described with reference to a preferred embodiment thereof, it is to be understood that modifications or variations may be easily made without departing from the spirit of this invention, which is defined by the appended claims.

CITED REFERENCES

U.S. Pat. No. 04,274,053
U.S. Pat. No. 04,988,945
U.S. Pat. No. 05,258,735
U.S. Pat. No. 05,757,180
U.S. Pat. No. 04,319,188
U.S. Pat. No. 05,036,276
U.S. Pat. No. 05,302,893
U.S. Pat. No. 05,783,940
U.S. Pat. No. 04,774,464
U.S. Pat. No. 05,036,319
U.S. Pat. No. 05,325,056
U.S. Pat. No. 05,939,879
U.S. Pat. No. 04,851,711
U.S. Pat. No. 05,172,057
U.S. Pat. No. 05,489,845
U.S. Pat. No. 05,949,051

What is claimed is:

1. An electromagnetic mark device for a magnetism encoder, which applies the electric current magnetic field as the electromagnetic mark, comprising an insulated base plate; and a thin lead wire, being fixed to the base plate;

characterized in that the thin lead wire are laid out on the base plate as a circuit in a way of providing a continuously twisted and turned shape with a constant pitch such that a plurality of alternate magnetic marks are formed with continuous magnetic poles N·S·N·S once the current passes through the lead wire.

2. The electromagnetic mark device for a magnetism encoder according to claim 1, wherein the circuit is laid out to form a shape of square wave with the constant pitch.

3. The electromagnetic mark device for a magnetism encoder according to claim 1, is fabricated by way of the technique of printed circuit board.

4. The electromagnetic mark device for a magnetism encoder according to claim 2, is fabricated by way of the technique of printed circuit board.

5. The electromagnetic mark device for a magnetism encoder according to claim 1, is fabricated by way of the technique of photo etching.

6. The electromagnetic mark device of a magnetism encoder according to claim 2, is fabricated with the technique of photo etching.

7. The electromagnetic mark device of a magnetism encoder according to claim 1, is fabricated by way of numerical controlled (NC) machine.

8. The electromagnetic mark device of a magnetism encoder according to claim 2, is fabricated by way of numerical control (NC) machine.

* * * * *